United States Patent [19]
Tsao

[11] Patent Number: 4,476,160
[45] Date of Patent: Oct. 9, 1984

[54] FLUIDIZED BED SYSTEM
[75] Inventor: Utah Tsao, Jersey City, N.J.
[73] Assignee: The Lummus Company, Bloomfield, N.J.
[21] Appl. No.: 387,922
[22] Filed: Jun. 14, 1982
[51] Int. Cl.³ ............................................. F27B 15/08
[52] U.S. Cl. .................... 422/144; 422/145; 502/41
[58] Field of Search ................ 422/144, 145; 252/417; 502/41

[56] References Cited
U.S. PATENT DOCUMENTS

| | | | |
|---|---|---|---|
| 2,726,197 | 12/1955 | Ewell | 422/144 X |
| 2,758,959 | 8/1956 | Nicolai | 422/144 X |
| 2,804,368 | 8/1957 | Summers | 422/144 X |
| 2,833,699 | 5/1958 | Dicks | 422/144 X |
| 2,902,432 | 9/1959 | Codet et al. | 422/144 X |
| 3,619,415 | 11/1971 | Jones et al. | 422/144 X |
| 3,751,359 | 8/1973 | Bunn | 422/144 X |
| 4,379,123 | 4/1983 | Daviduk et al. | 422/144 X |

FOREIGN PATENT DOCUMENTS 535869  1/1957  Canada ................................ 422/144

Primary Examiner—Barry Richman
Assistant Examiner—William R. Johnson
Attorney, Agent, or Firm—Elliot M. Olstein; John N. Bain

[57] ABSTRACT

In a fluidized bed system, including a fluidized bed vessel and a separate stripping vessel below the fluidized bed wherein solids from the fluidized bed are introduced into the stripping vessel, there is provided a vent line from the top of the stripping vessel to the fluidized bed for venting gas from the stripper to the fuidized bed. A portion of the solids introduced into the stripper are carried into the vent line to maintain the static head between the top portion of the fluidized bed and the stripping vessel.

4 Claims, 3 Drawing Figures

FLUIDIZED BED SYSTEM

This invention relates to fluidized beds, and more particularly to a system which includes a fluidized bed vessel and a separate stripping vessel.

In most cases, the solids discharged from a fluidized bed vessel contain entrapped vapor and adhered higher boiling compounds, and in order to further free such solids for recycle to the bed, it is necessary to strip the solids of such materials by use of an inert gas. In some cases, the stripper is connected directly by a flange to the bottom of the reactor; however, in such a case, a part of the reaction area is occupied by the stripper, and the reactants introduced into the reactor are diluted by the stripping vapor.

If the stripper and the fluidized bed vessel are installed as separate vessels, then the stripping gas must be vented from the stripping vessel.

In accordance with the present invention, in a system including a vessel containing a fluidized bed, and a separate stripper, there is provided an improved apparatus and procedure for venting of stripping gas from the stripper.

More particularly, in accordance with one aspect of the present invention, there is provided a method or process for venting stripping gas from the stripper of a system which includes a stripper, a vessel including a fluidized bed positioned above the stripper, wherein the stripping gas is vented from the stripper to the vessel containing the fluidizied bed through a separate vent in which there is provided a sufficient pressure drop to maintain the static pressure head between the upper portion of the vessel containing the fluidized bed and the upper portion of the stripper, whereby the upper portion of the stripper is maintained at a pressure higher than the pressure prevailing in the upper portion of the vessel including the fluidized bed.

In accordance with a preferred embodiment of the invention, such a pressure drop is achieved in the vent line by causing solids to flow through at least a portion of the vent line along with the vent gas, with such flow of solids providing a static head and friction sufficient to maintain the static head between the top of the vessel including the fluidized bed, and the top of the stripper.

In accordance with another aspect of the present invention, there is provided an apparatus system which includes a vessel having a fluidized bed therein, and a stripper positioned below the vessel wherein there is provided means for transferring solids from the vessel to the stripper; and means for introducing a stripping gas into the stripper; and means for transferring vent gas from the stripper to the vessel which provides a pressure drop to maintain the static head between the upper portion of the vessel and the upper portion of the stripper.

In accordance with a preferred embodiment, the vent gas is transferred from the stripper to the vessel through a vent line which vents the gas at a point in the stripper above the point at which solids are introduced into the stripper from the vessel, with solids being carried through the vent line with the stripping gas, whereby the statis head of the solids and friction in the vent line maintain the static head between the upper portion of the vessel and the upper portion of the stripper.

In accordance with one aspect of such an embodiment, the vent line may include a separator for separating solids contained in the vent gas prior to introduction of the vent gas into the vessel containing the fluidized bed. In such an embodiment, the separated solids may be returned to the stripper.

In accordance with another embodiment, the vent line from the stripper to the vessel including the fluidized bed may include a restriction, such as an orifice to provide a portion of the required pressure drop. In such an embodiment, the solids carried through the vent line may be in the form of fines, with a change in the amount of fines in the vent gas causing a change in the density of material flowing through the orifice and the pressure drop therethrough to maintain the statis head between the upper portion of the stripper and the upper portion of the vessel including the fluidized bed.

The present invention is applicable to a wide variety of fluidized bed systems which employ a separate stripping vessel, and has particular applicability to a fluidized bed system wherein the solids used in the fluidized bed include particles for catalyzing and for providing reactants for a reaction in the fluidized bed.

The invention will be further described with respect to the accompanying drawings wherein.

Figure 1:
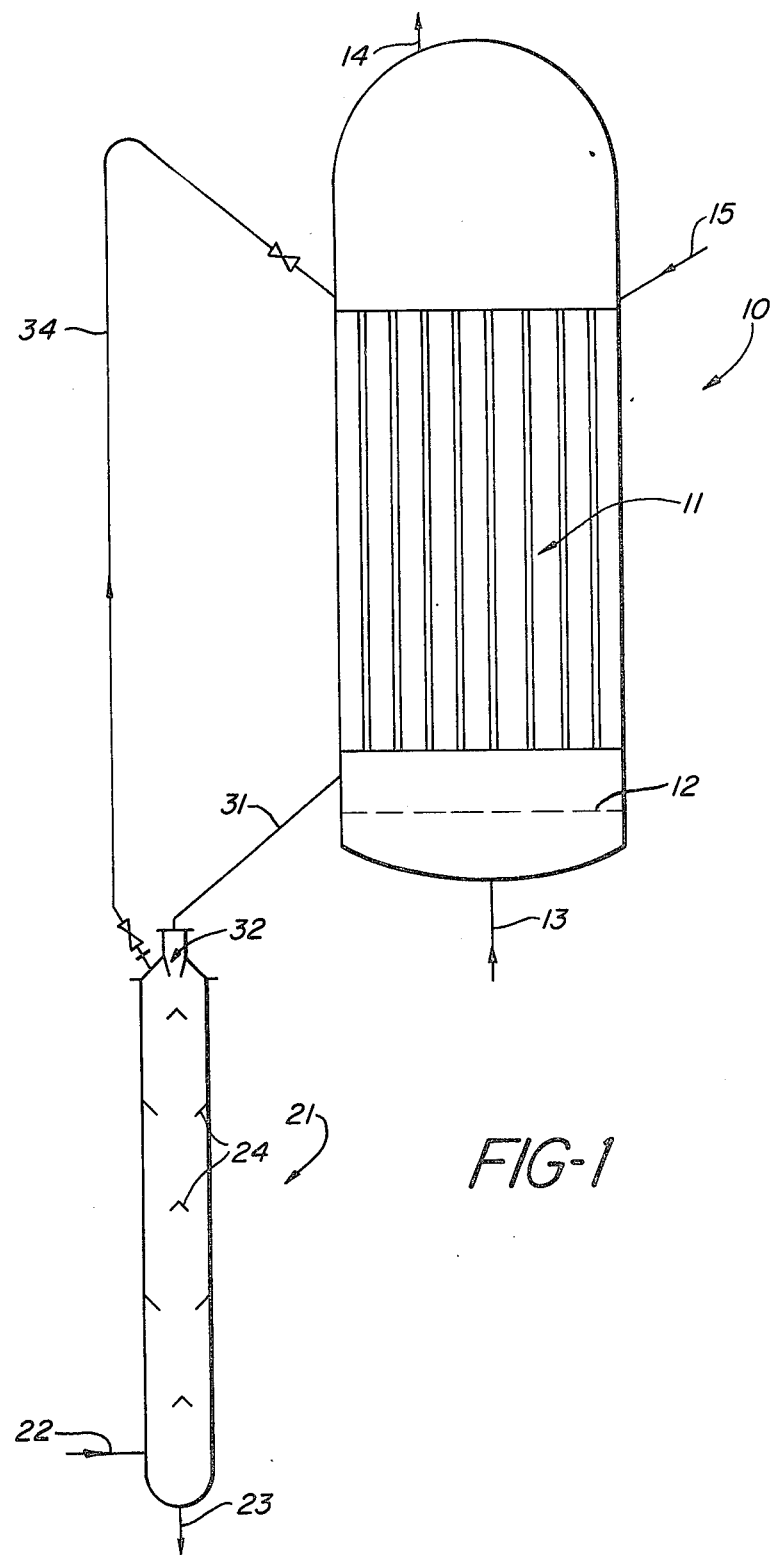
FIG. 1 is a simplified schematic representation of an embodiment of the present invention.

Referring now to FIG. 1 of the drawing, there is shown a vessel 10, which includes a fluidized bed of solids, generally indicated as 11. The vessel 10 is provided with a suitable vapor distribution grid 12, and an inlet means 13 for introducing reactants into the vessel 10. It is to be understood that although only a single inlet 13 is shown, the vessel may be provided with more than one inlet for introducing the reactants. Vessel 10 is further provided with an outlet 14 for removing effluent from vessel 10, and an inlet 15 for introducing regenerated solids into the vessel 10. As particularly described, the fluidized bed of solids is a catalyst for a reaction, and regenerated catalyst is introduced into vessel 10 through inlet 15.

The system further includes a stripping vessel, schematically generally designated as 21, which is positioned below the vessel 10 and which is provided with a suitable stripping gas, such as steam through inlet line 22, an outlet 23 at the bottom thereof for withdrawing from vessel 21 stripped solids and baffles 24 for redistributing solids. In general, the stripped solids withdrawn from vessel 21 through line 23 are circulated to a regenerator for regenerating the spent catalyst.

The system is provided with means for transferring solids from the vessel 10 to the stripper 21 in the form of a conduit 31 having one end connected to vessel 10, and the other end connected to the inlet means for vessel 21, in the form of an inlet cone 32. The inlet cone 32 extends into the vessel 21 so that the outlet thereof is below the top of the vessel, whereby, as hereinafter described, vent gas may be withdrawn from vessel 21 at a point higher than the point at which solids are introduced.

The system is further provided with means for venting stripping gas from stripper 21 to vessel 10 in the form of a vent conduit, generally indicated as 34, having its inlet end connected to the top of vessel 21 at a point higher than the point at which solids are introduced into vessel 21 through inlet cone 32, and its outlet end connected to vessel 10 at a point above the top of fluidized bed 11. As particularly shown, the conduit 34 is comprised of a vertical portion, and a sloped portion, at the outlet end thereof, which is at a minimum of 30° to the horizontal so as to facilitate passage of solids into the vessel 10. Although vent conduit 34 is preferably in communication with vessel 10 above the fluidized bed 11, it is to be understood that the vent conduit 34 may communicate with the vessel at a lower point; i.e., below the top of the bed 11.

In accordance with the embodiment, by positioning the vent line higher than the point at which solids are introduced into vessel 21, a portion of the solids which are introduced into vessel 21 flow along with the vent gas through conduit 34 into vessel 10. As a result, there is established a moving column of particles through conduit 34 in conjunction with the flow of vent gas, and the static head of such particles and friction in conduit 34 maintains the static head between the upper portion of vessel 10 and the upper portion of stripper 21, whereby the upper portion of stripper 21 is at a pressure greater than the upper portion of vessel 10. The amount of solid flow through vent conduit 34 is self-adjusting to maintain the pressure difference between the inlet end of the vent conduit in stripper 21 and the outlet end of the vent conduit in vessel 10, whereby the static head between the tops of vessels 10 and 21 is automatically maintained to provide a maximum pressure in the top of stripper 21. As a result, a maximum driving force for catalyst circulation is also maintained.

Although the invention has been described with respect to a preferred embodiment, it is to be understood that the embodiment may be modified within the spirit and scope of the invention.

Figure 2:
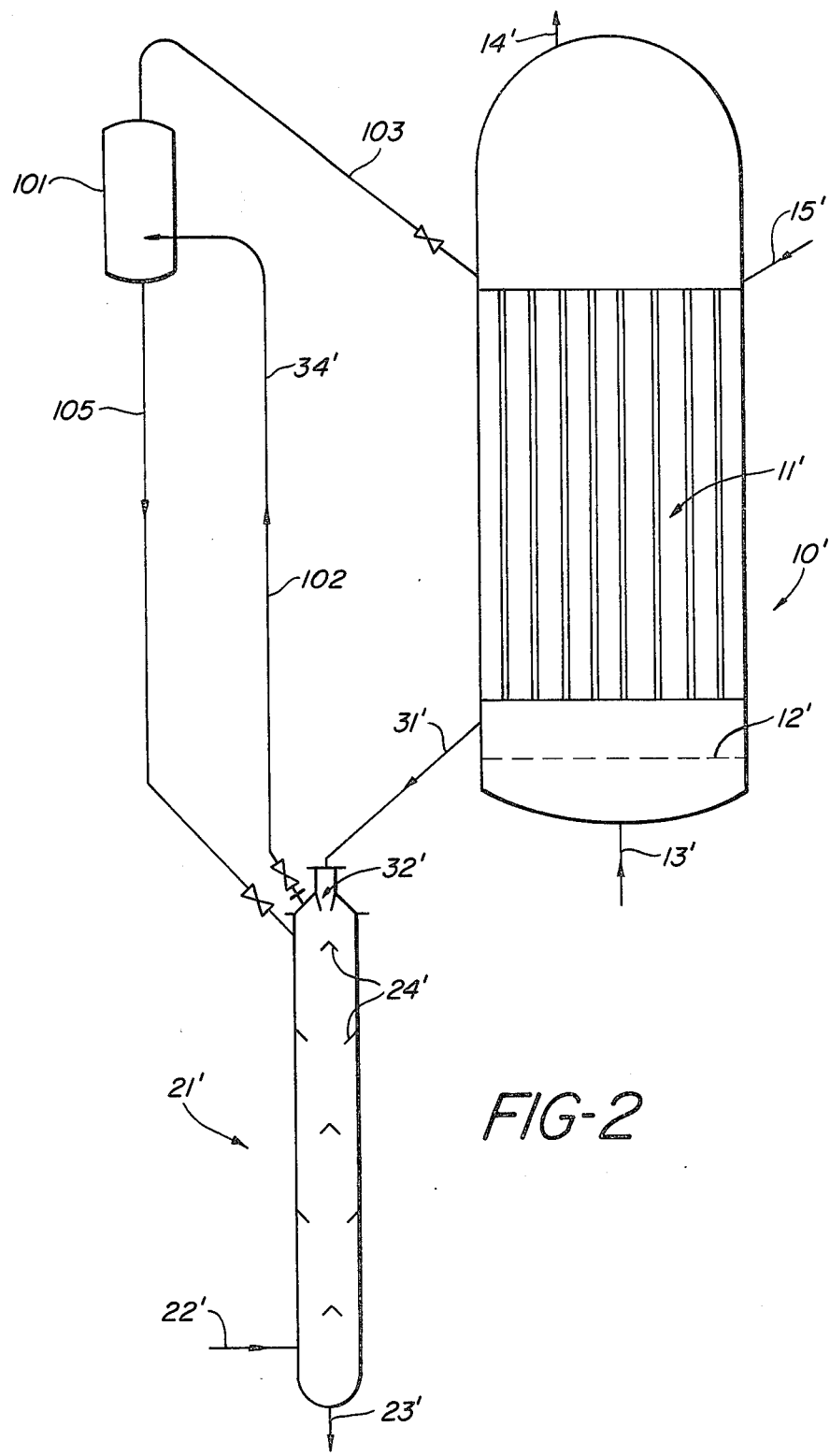
FIG. 2 is a simplified schematic representation of another embodiment of the present invention.

A modification of the embodiment of FIG. 1 is shown in FIG. 2, wherein like parts are designated by like prime numerals. In accordance with the embodiment of FIG. 2, the vent line includes a separator for removing particles flowing therethrough for return to the stripper, whereby the particles need not be introduced into the vessel including the fluidized bed.

Referring now to FIG. 2, the vent line 34', includes a gas-solid separation vessel 101 for removing solids from the initial portion 102 of the vent line 34', whereby only gas flows through the final portion 103 of the vent line 34' into vessel 10'. The separator 101 is provided with a solid return line 105 for passing separated solids from separator 101 to stripper 21'.

As in the embodiment of FIG. 1, the amount of solids which flows through the initial portion 102 of vent line 34' is automatically adjusted to provide the requisite pressure drop through the vent line 34', whereby the static head between the top of vessel 10' and the top of stripper 21' is automatically maintained.

Figure 3:
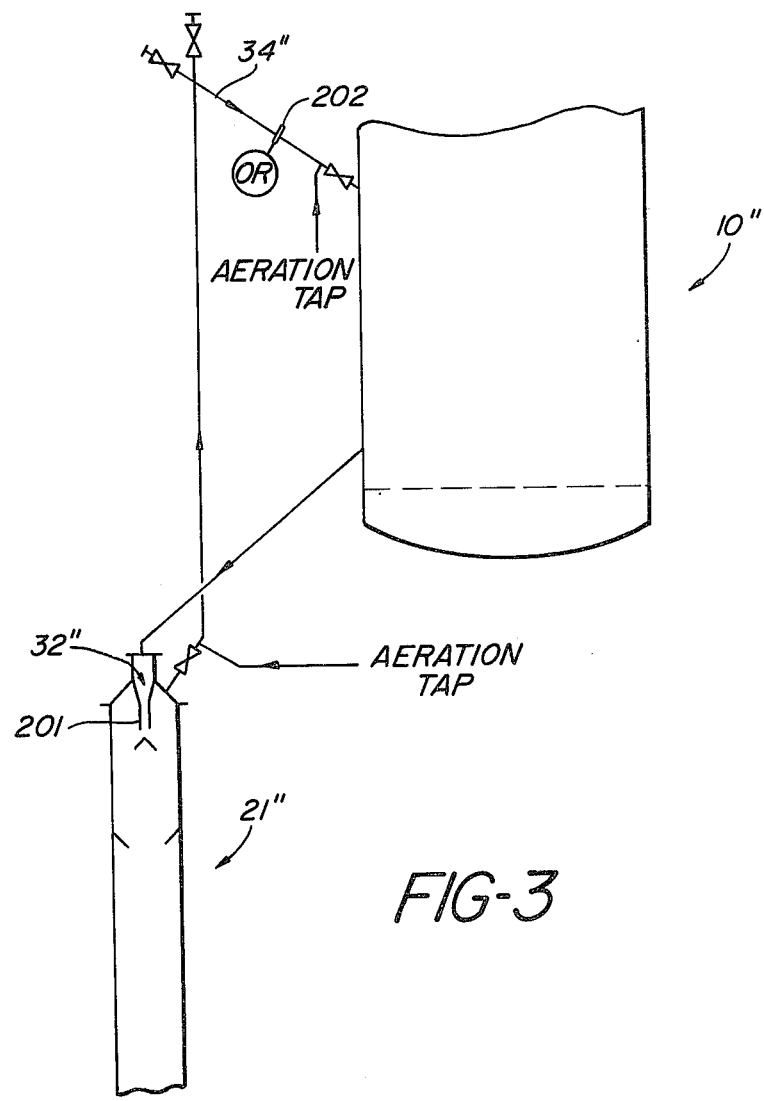
FIG. 3 is a simplified schematic representation of a further embodiment of the present invention.

A further modification is shown in FIG. 3 of the drawings wherein parts similar to the embodiment of FIG. 1 are shown with like double prime numerals. In the embodiment of FIG. 3, the vent line is provided with a restriction in the form of an orifice to automatically control the pressure drop in the vent line to maintain the static head.

Referring now to FIG. 3 of the drawings, the inlet cone 32" is provided with an extension 201 so that the solids are introduced into stripper 21" at a lower point.

The vent line 34" is provided with a restriction in the form of an orifice 202 to provide a portion of the pressure drop through the vent line 34" which is required to maintain the static head between the top of vessel 10" and stripper 21".

In operation, the orifice 202 is sized to provide a portion of the required pressure drop (based on gas flow only). As the level of solids in stripper 21" rises, the carry-over of solid fines into vent line 34" is increased, which increases the pressure drop through orifice 202, resulting in an increase in the pressure in the vapor space of stripper 21". Such increase in pressure reduces the flow of fines through vent line 34" and eventually the flow of fines adjusts so that the pressure drop across orifice 202 (gas and solids) maintains the static head between the top of stripper 21" and the top of vessel 10". The amount of fines carried through line 34" varies with the level of solids in stripper 21", and such level is self-adjusting in accordance with the pressure drop through vent line 34".

The pressure drop across orifice 202 increases as the amount of solids in the vent line increases, and vice versa.

Although the system of the present invention may be used in any one of a wide variety of systems, the present invention has particular applicability to a reaction system for producing an aromatic nitrile from an alkyl aromatic hydrocarbon. In particular, the system has applicability to a process for producing an aromatic nitrile wherein ammonia and alkyl aromatic are introduced into the fluidized bed, which contains, for example, a supported vanadia catalyst, for production of nitrile as disclosed, for example, in U.S. Pat. No. 3,963,645. Catalyst is periodically withdrawn from the fluidized bed, stripped in the stripper, and then introduced into a regeneration zone positioned above the fluidized bed reactor wherein the catalyst is contacted with oxygen to effect regeneration thereof. The regenerated catalyst is then recycled to the fluidized bed reactor. The contact with the oxygen maintains the vanadia in an oxidized form necessary for nitrile production.

The present invention will be further described with respect to the following example, however, the scope of the invention is not to be limited thereby.

EXAMPLE

In an aromatic nitrile plant using an alkyl aromatic hydrocarbon as feed the reactor diameter is 9'-0" and that of a stripper is 3'-0". If the stripper is flanged directly to the reactor it would take away 11% of the reactor area. The stripper vent gas would dilute the feed gas to the reactor by about 6%.

When the stripper is separated from the reactor and there is no separate vent line from the stripper, the vent gas is vented through the catalyst feed line. In such case, for a catalyst circulation of 100,000 lb/hr, with a fluidized density of 20 lb/ft$^3$ the required size of the catalyst feed line to the stripper would be 20" to allow a countercurrent flow of the gas against the solids flow. If the stripper has a separate vent line, then the feed line can be reduced to 6". In venting the stripper, in such a case, there is provided a control valve in the feed line to maintain a catalyst level in the top of the stripper and the vent gas is vented above the level to the top of the reactor. Thus, the pressure at the top of the stripper is essentially the same as that at the top of the reactor. The level in the top of the stripper is about 20 ft. below the level of the fluidized bed in the reactor. The control valve consumes the 20 ft. of static head to balance the pressure between the top of the stripper and the top of the reactor.

In the present invention (FIG. 1), there is no control value in the feed, and the pressure in the top of the stripper is 20 ft. of static head higher than in the top of the reactor. A 4" vent line is connected to the top of the stripper above the catalyst feed point in the stripper. The superficial velocity of the vent gas in the 4" line is about 25 ft/sec. About 100,000 lb/hr of catalyst will be lifted into the vent line to create a static head and friction loss to balance the pressure between the top of the stripper and the top of the reactor. In an alternate scheme (FIG. 2), the catalyst in the vent line is separated out from the vent gas in a small knockout drum and returned to the top of the stripper.

In the catalyst circulation loop between the reactor fluidized bed and regenerator, positioned above the reactor, the driving force for the circulation is about 100 ft. of static head of the fluidized catalyst. The present invention will reduce the required head by 20%. This means that the elevation of the large regenerator can be lowered by 20 ft.

The spent catalyst is still active catalytically and contains more than 30% of available oxygen in the catalyst. By recycling a large amount of the spent catalyst through the reactor, the catalyst to hydrocarbon ratio is increased. This would increase the selectivity of the hydrocarbon to nitrile product.

The present invention is particularly advantageous in that it is possible to accomplish stripping of the solids from the fluidized bed in a separate vessel, without restricting flow of the solids from the bed to the stripper. Moreover, the system is self-regulating to maintain the static head between the top of the bed and the top of the stripper. In addition, such a result can be accomplished without including a valve or any other restriction in either the solid flow line from the bed to the stripper, or in the vent line from the stripper to the bed.

These and other advantages will be apparent from the teachings herein.

Numerous modifications and variations of the present invention are possible in light of the above teachings and, therefore, within the scope of the appended claims, the invention may be practiced otherwise than as particularly described.

What is claimed is:

1. In a process for venting gas from a stripping vessel which receives solids from a vessel containing a fluidized bed of solids, and which is positioned below and independent of said vessel, the improvement comprising:

venting gas from the stripper to the vessel through a vent line; and passing a sufficient portion of the solids from the stripping vessel through at least a portion of the vent line to maintain the static head between the upper portion of the vessel and the upper portion of the stripper via said flow of gas and solids in the vent line.

2. The process of claim 1 wherein pressure is reduced in the vent line by a flow restricting orifice in the vent line.

3. The process of claim 1 wherein solids in the vent line are separated from the vent gas prior to introduction of vent gas into the vessel.

4. The process of claim 3 wherein separated solids are returned to the stripper.

* * * * *